United States Patent [19]

Ehrhart

[11] 4,436,784
[45] Mar. 13, 1984

[54] PROCESS FOR PREPARING PLASTICIZED POLYVINYL CHLORIDE SUBSTRATES COMPRISING A MOISTURE-CURED POLYURETHANE COATING AND THE PRODUCTS RESULTING THEREFROM

[75] Inventor: Wendell A. Ehrhart, Hallam, Pa.

[73] Assignee: Armstrong World Industries, Inc., Lancaster, Pa.

[21] Appl. No.: 352,355

[22] Filed: Feb. 25, 1982

[51] Int. Cl.³ .............................................. B32B 27/40
[52] U.S. Cl. ............................ 428/423.1; 427/393.5; 428/424.6
[58] Field of Search ............... 427/385.5, 393.5, 412.1, 427/412.4, 407.1, 389.9, 155, 317; 524/775; 264/DIG. 77; 428/423.1, 424.6

[56] References Cited

U.S. PATENT DOCUMENTS

| | | | |
|---|---|---|---|
| 3,726,827 | 4/1973 | Jones et al. | 524/775 |
| 3,892,895 | 7/1975 | Toogoo et al. | 427/393.5 |
| 3,939,222 | 2/1976 | Dieterich | 427/385.5 |
| 3,980,606 | 9/1976 | Werner | 524/775 |
| 4,000,105 | 12/1976 | Olstowski | 524/775 |
| 4,045,600 | 8/1977 | Williams | 427/412.4 |
| 4,071,492 | 1/1978 | Bethea et al. | 524/775 |
| 4,206,255 | 6/1980 | Wenzel et al. | 427/393.5 |
| 4,333,987 | 6/1982 | Kwart et al. | 428/424.6 |
| 4,361,626 | 11/1982 | Boba et al. | 428/424.6 |

*Primary Examiner*—Sadie L. Childs
*Attorney, Agent, or Firm*—Laird F. Miller

[57] ABSTRACT

The present invention relates to polyurethane coatings and to processes for preparing and applying said coatings whereby a prepolymer composition comprising a moisture-curable prepolymer and a plasticizer is prepared and applied to a substrate. When cured, the coated substrate demonstrates good wearability, stain resistance, and appearance, yet the use of volatile solvents may be avoided.

8 Claims, No Drawings

PROCESS FOR PREPARING PLASTICIZED POLYVINYL CHLORIDE SUBSTRATES COMPRISING A MOISTURE-CURED POLYURETHANE COATING AND THE PRODUCTS RESULTING THEREFROM

The present invention relates to moisture-curable polyurethane coating compositions and more particularly to moisture-curable polyurethane coating compositions which comprise a plasticizer.

BACKGROUND OF THE INVENTION

Moisture-curable polyurethane coatings have been in use for a number of years. These coatings have been found to demonstrate superior wear characteristics when used on flooring products and, furthermore, they have demonstrated relatively good resistance to a variety of household staining agents. Nevertheless, such coatings have not proved to be satisfactory in all respects when used as floor coverings.

One method of preparing a durable flooring product is by forming a gelled, plasticized resilient substrate such as polyvinyl chloride, coating the substrate with a thin layer of moisture-curable urethane prepolymer, and then exposing the resulting material to heat and moisture to fuse the composite structure and cure the wear layer. Certain problems have been encountered with such structures, however. For example, the coating material is usually applied as a solvent solution which requires special handling. Further, plasticizer has tended to migrate from the substrate into the polyurethane wear layer, thus diminishing or altering the desirable characteristics of this layer. Accordingly, the flooring industry has investigated various ways to overcome these problems.

THE PRIOR ART

A number of patents illustrate the application of polyurethane coatings to substrates essentially as set forth above. For example, U.S. Pat. No. 3,499,783 indicates that an appropriate polyurethane can be prepared either in the presence or absence of a solvent; however, it is indicated that any of a group of listed solvents, but preferably a volatile solvent, can be used to give a coating composition having a suitable viscosity. Similarly, the use of volatile solvents is taught in U.S. Pat. Nos. 3,577,257; 3,752,694; and 3,908,043. Conversely, U.S. Pat. No. 4,070,323 discloses the use of solvent-free aqueous emulsions of polyurethane materials, and U.S. Pat. No. 4,180,615 discloses the use of a coating composition which comprises essentially no solvent.

Other references have addressed the plasticizer migration problem. For example, U.S. Pat. No. 4,045,600 discloses a method for inhibiting plasticizer migration by applying a plurality of polyurethane layers to a plasticized substrate. This patent makes reference to U.S. Pat. No. 3,669,717 which provides an alternative means of inhibiting plaasticizer migration. U.S. Pat. No. 4,175,156 teaches that the strength of a bond between a plasticized resin and a polyurethane coating may be maintained through the use of an adhesive which resists plasticizer migration. Nevertheless, these approaches have not proved to be entirely satisfactory in resolving the aforementioned problems.

Accordingly, one objective of the present invention is to provide a process for preparing a moisture-curable polyurethane floor covering in which the use of solvent may be avoided, thereby obviating the use of energy for solvent evaporation and minimizing the pollution which results therefrom.

Yet another objective of the present invention is to provide a moisture-curable polyurethane floor covering in which the effects of plasticizer migration are minimized.

Still yet another objective of the present invention is to provide a floor covering whose resistance to staining does not deteriorate with time.

These and other advantages of the present invention will become apparent from the detailed description of preferred embodiments which follow.

SUMMARY OF THE INVENTION

The present invention relates to polyurethane coatings and to processes for preparing and applying said coatings whereby a prepolymer composition comprising a moisture-curable prepolymer and a plasticizer is prepared and applied to a substrate. When cured, the coated substrate demonstrates good wearability, stain resistance, and appearance, yet the use of volatile solvents may be avoided.

DETAILED DESCRIPTION OF PREFERRED EMBODIMENTS

In one embodiment, the present invention relates to a process for preparing a moisture-cured polyurethane coating on a substrate, said process comprising the steps of preparing a prepolymer composition comprising a moisture-curable prepolymer and a plasticizer, applying said prepolymer composition to a substrate, and curing the coated substrate.

In a second embodiment, the present invention relates to a polyurethane coating composition comprising a moisture-curable prepolymer and a plasticizer.

The coating compositions used to practice the present invention will comprise moisture-curable polyurethane prepolymers which are well known in the art. Particularly suitable are prepolymers derived from one or more polyisocyanate and one or more polyol, polyether polyols and polyester polyols being especially preferred.

Conventional plasticizers are used to practice the present invention. These substances are generally recognized to be nonreactive, nonvolatile, organic liquids typically having a boiling point of not less than about 340° C. Examples of such materials are dioctyl phthalate, butyl benzyl phthalate, tricresyl phosphate, 2-ethylhexyl phthalate, diisodecyl phthalate, butyl cyclohexyl phthalate, dicyclochexyl phthalate, dicapryl phthalate, dioctyl adipate, dibutyl sebacate and the like.

In the prior art, a common difficulty which is encountered is the migration of plasticizer from the substrate into the wear layer. Presumably this occurs because the coating, which contains no plasticizer, acts as a sink for the plasticizer in the substrate. Thus, with time, the plasticizer tends to equilibrate between the two layers and in doing so, imparts a gummy or tacky character to the wear layer. Consequently, the wear layer soils more easily and it also tends to lose its resistance to staining. This accounts in part for the poor performance characterstics shown by some floors as they age.

Surprisingly and unexpectedly, I have found that if the moisture-curable prepolymer is applied to a substrate in a plasticizer solution, the resulting coated material will demonstrate good wearability and stain-resisting characteristics. Furthermore, these characteristics will remain stable or improve with time. This result is attributable to the presence of plasticizer in the wear layer. Preferably the added plasticizer in the wear layer will be initially either at equilibrium with the substrate, or at a level greater than equilibrium. Thus, if any migration of plasticizer occurs it will be from the wear layer into the substrate. Accordingly, the performance of the floor stays the same, or it improves as plasicizer migrates to achieve equilibrium. As added advantages, the use of volatile and potentially hazardous solvents is avoided, the coated surface is uneffected by plasticizer contained in the underlying substrate, and the appearance of the product is often superior to those prepared using solvent-containing prepolymers.

The substrates which are preferred when practicing the present invention are those plasticized substrates which are conventionally used in the flooring industry, plasticized polyvinyl chloride being especially preferred. In the latter case, the substrate may be fused or unfused, as desired.

Application of the coatings to nonplasticized or impermeable substrates has also been shown to give satisfactory results. For example, a coating of the present invention has been applied to a glass substrate. Thus, it should be apparent that the present invention provides the opportunity of optionally preparing a coated flooring product directly or of preparing a coating on a first substrate, e.g. a carrier, removing it from the first substrate, and subsequently adhering it to a second substrate by means well known in the art.

To practice the present invention a coating composition is prepared from conventional components. For example, U.S. Pat. No. 3,499,783 which was referred to above details the types of compounds which are applicable to prepare the prepolymer. Preferably, the prepolymer is prepared using the plasticizer as the solvent by reacting one or more polyols with an equivalent excess of one or more polyisocyanates. As a less desirable alternative, however, the prepolymer could be prepared in a solvent solution and then applied as a plasticizer solution after removal of the solvent. An equivalent excess is generally considered to be 1.2 to about 5.0 equivalents of polyisocyanate for every 1 equivalent of polyol.

The amount of plasticizer that is used when applying the prepolymer composition will depend on the viscosity that is desired, as well as on the level of plasticizer that is required to equal or exceed the equilibrium level of plasticizer in the wear layer. Usually at least 25 parts of plasticizer should be used for every 100 parts of prepolymer precursors (polyol plus isocyanate), but preferably the level of plasticizer will be greater than 40 parts per 100 and most preferably it will be greater than 60 parts per 100. In addition to these components, the coatings may also contain commonly used additives such as UV screeners, flow aids, dyes, and catalysts. The coating composition could also contain solvent, although one objective of the present invention is to avoid or reduce the use of solvents.

The resulting coating is placed on a substrate at a desired thickness up to about 10 mils, although coatings having a thickness of 0.5-3 mils are preferred. In the majority of cases the coating is placed on a plasticized resilient sheet, the surface of the sheet preferably being gelled so as to provide a suitable surface to receive the coating. Once the coating is applied, the coated sheet is heated and moisture cured causing the plasticizer to migrate into the substrate, thereby leaving a coating having superior durability and stain resistance.

If an impermeable substrate such as glass is used, the results are somewhat different. Heating and moisture curing also cause migration of the plasticizer; however, because the substrate cannot absorb the plasticizer, the plasticizer appears to migrate in all directions out of the coating. Thus, if sufficient plasticizer is present, puddles of plasticizer can form on the surface of the cured coating and must be removed. While applicant does not desire to be bound as to any theory of operability, it appears likely that during the curing process, the compatibility of the plasticizer with the polymer is diminished, thereby causing the plasticizer to migrate out of the coating. As it migrates, it may aid in the diffusion of lower molecular weight species to the coating/air interface, thus changing the surface character of the coating. Consequently, the characteristics of the resulting product differ from those of prior art moisture-cured coatings.

The following examples will serve to illustrate, but not to limit, the scope of the present invention.

EXAMPLES

Preparation of Polyester Polyols

Examples I and II illustrate the preparation of polyester polyols from the ingredients listed in the following table.

| Ingredients | Example No. (weight of components in grams) | |
| --- | --- | --- |
| | I | II |
| Phthalic anhydride | 1873 | 629 |
| Isophthalic acid | — | 1310 |
| 1,6-Hexanediol | 1195 | 931 |
| Ethylene glycol | 432 | — |
| Diethylene glycol | — | 396 |
| Triethylene glycol | — | 91 |
| Trimethylolpropane | — | 144 |
| Dibutyltin bis-laurylmercaptide | 2.29 | 2.2 |
| Acid number of polyol | 1.1 | 0.55 |
| Hydroxyl number of polyol | 111.4 | 50.5 |

The above ingredients were treated as follows: To a 5-liter, 5-necked flask equipped with mechanical stirrer, thermometer, gas inlet tube, and condenser were charged the ingredients listed in the table. The respective mixtures were heated gradually to 220° C. under a slow nitrogen flow and held at 220° C. while distilling off the water formed in the reaction. Distillation was continued until the acid number fell to about 1.0; however, as the acid number dropped below about 50, the nitrogen flow was gradually increased to 1.0 standard cubic feet per hour (SCFH).

The procedure for Example I was somewhat different due to the presence of excess glycol. For that reason, when the acid number fell below 1.5, the condenser and gas inlet tube were removed and the flask was evacuated by a pump to a pressure of ca 1 mm of mercury to remove ca 90 ml of glycol by distillation at 220° C.

Preparation of Polyurethane Prepolymer Compositions

Examples III–VI illustrate the preparation of the prepolymer compositions from the ingredients listed in the following table. Examples III and IV are polyester polyol prepolymers whereas Examples V and VI are polyether polyol prepolymers.

|  | Example No. (weight of components in grams) | | | |
|---|---|---|---|---|
| Ingredients | III | IV | V | VI |
| Heptane | 84 | 77.5 | 64.2 | 80.3 |
| Dibutyl phthalate | 840 | — | — | — |
| Dihexyl phthalate | — | 800 | — | — |
| Dioctyl phthalate | — | — | 650 | 826 |
| Polyester of Example I | 254 | — | — | — |
| Polyester of Example II | — | 456 | — | — |
| Polypropylene oxide triol (equiv. wt. 239; glycerine initiated) | — | — | 287 | 191 |
| Tripropylene glycol | — | — | 28.8 | 21.9 |
| Polypropylene oxide triol (equiv. wt. 141; tri-methylolpropane initiated) | — | — | — | 56.3 |
| Dibutyltin bis-laurylmercaptide | — | 3.08 | 3.25 | — |
| Dimethyltin dineodecanoate | 0.720 | — | — | 2.94 |
| Desmodur W (dicyclohexylmethane-4,4'-diisocyanate) | 106 | 160 | 334 | 319 |
| Multiflow XA-677 (leveling aid) | — | 9.90 | — | 9.90 |
| Ionol (antioxidant) | — | — | 0.650 | 0.588 |
| Viscosity of prepolymer (cps) | 570 | 37,500 | 58,000 | 37,000 |

The aforementioned ingredients, excluding the Desmodur W, the catalyst, the leveling aid and the antioxidant, were charged into a 2-liter flask equipped with a mechanical stirrer, thermometer, gas inlet tube, and an azeotropic water trap. When the flask reduced 110° C., it was gradually evacuated to a pressure of 40 mm of mercury, thereby removing any moisture present in the polyol, and also removing substantially all of the heptane as part of the azeotropic mixture. The resulting mixture was cooled to 25° C. and the Desmodur W and the appropriate catalyst were added. The temperature was then raised to 85±5° C. and maintained for ca 45 minutes (±15 min.). The mixtures were then cooled to room temperature and the antioxidant and leveling aid were added (if applicable).

Preparation of Substrates

Plasticized substrates were prepared comprising a backing, a foamable plastisol and a clear vinyl plastisol layer. The plastisol layers had the following compositions:

| Ingredient | Parts Per 100 Parts of Resin (by weight) |
|---|---|
| Foamable Plastisol | |
| Dispersion Grade PVC Resin | 71.4 |
| Blending Grade PVC Resin | 28.6 |
| Plasticizer | 33.2 |
| Filler, Stabilizer, Blowing Agent, Pigment, etc. | 51 |
| Clear Vinyl Plastisol | |
| Dispersion Grade PVC Resin | 70 |
| Blending Grade PVC Resin | 30 |
| Plasticizer | 37.5 |
| Stabilizers, etc. | 3 |

Substrate A

This substrate was prepared by coating a layer of foamable plastisol at a thickness of 24 mils on a backing. The coated backing was gelled, after which the clear vinyl coating was applied at a thickness of 10 mils and gelled. When subsequently coated and expanded, the foamed layer had a thickness of ca 91 mils.

Substrate B

This substrate was prepared by coating a layer of foamable plastisol at a thickness of 9 mils on a backing and gelling the plastisol. The gelled surface was printed with a pattern and the clear vinyl coating was applied at a thickness of 8.5 mils, after which the coating was gelled. When subsequently coated and expanded, the foamed layer had a thickness of ca 32 mils.

Preparation of Coated Samples

Example VII

The coating composition of Example III was coated at a thickness of approximately 0.5 mils onto Substrate A using a reverse roll coater. The coated substrate was passed through a 48-foot, 4-zone forced draft oven at a rate of 25 ft/min with temperatures of 275°, 435°, 435°, and 300° F. being used, respectively, in each of the four zones. Subjection of the sample to these conditions caused fusion of the substrate with the coating, expansion of the foamable plastisol, and moisture curing of the polyurethane coating material. The resulting sample had a high gloss, was dry to the touch, did not feel rubbery, and showed about the same resistance to Neazone A stain as a commercial no-wax reference product prepared using a solvent instead of the plasticizer. The product prepared according to the present invention was also very smooth and free from blemishes.

Example VIII

The composition of Example IV was coated at a thickness of 2.0 mils onto the same substrate used in Example VII, and the coated sample was treated as described therein. The Neazone A stain resistance was comparable to that of the aforementioned commercial reference material and film appearance was good.

Example IX

Substrate B printed with a red brick pattern was coated with the coating composition of Example V at a thickness of about 3.0 mils using a reverse roll coater. The sample was passed through the previously described 4-zone oven at a line speed of 20 ft/min using temperatures set at 275°, 425°, and 450° F., respectively, with the last zone being turned off. The resulting coating was dry to the touch, did not feel rubbery, and the background color was unusually deep and attractive due to the relative absence of bubbles in the clear vinyl layer between the foam substrate and the urethane film. When the sample was subjected to an oil-borne stain test using duPont #3 yellow dye in mineral oil, results were obtained which were similar to those demonstrated by a commercial reference material which had been prepared using solvent instead of plasticizer.

Example X

The composition of Example VI which contained 140 parts of dioctyl phthalate per 100 parts of prepolymer precursors was coated at a thickness of 1.5 mils onto Substrate B and treated as described in Example IX to give a high-gloss coating which was dry to the touch. After the material equilibrated for six days, quantitative multiple internal reflection infrared spectroscopy indicated that the coating surface contained 17.8±2.0 parts per 100 of dioctyl phthalate, whereas similar coatings applied to the same substrate using volatile solvents typically contained about 11±2 parts per 100 of dioctyl phthalate. The oil-borne stain referred to in Example IX was applied to the six-day old sample and allowed to stand for one hour, after which the stain was wiped off. A visible stain appeared on the surface. A sample of this material which included the stained area was set aside for ca. 3.5 months and then a portion of the sample adjacent the original stain was subjected to the same stain test. After one hour, the resulting stain was substantially lighter in color than the originally obtained stain. Remeasurement of the plasticizer content by infrared spectroscopy indicated that the coating surface contained 13.0±2.0 parts per 100 of dioctyl phthalate. This observation agrees with the stain test result because a lower level of plasticizer would be expected to coincide with a reduced level of staining.

The following tests were also run on the six-day old product and the results were compared to those obtained using the aforementioned commercial reference material.

| Test | Example X | Commercial Reference Material |
| --- | --- | --- |
| Sandpaper abrasion test, 20 revolutions using a 5-lb. weight | 0.0178 g lost | 0.0182 g lost |

These results indicate that the abrasion resistance of the two samples is comparable.

| Household stain resistance* | Example X | Commercial Reference Material |
| --- | --- | --- |
| Iodine | 4 | 4 |
| Merthiolate | 0 | 3 |
| Ball point pen ink | 4 | 4 |
| Mercurochrome | 0 | 0 |
| Liquid shoe polish | 0 | 0 |
| Mustard | 4 | 4 |
| Lipstick | 0 | 4 |
| Grape juice | 0 | 1 |
| Denatured alcohol | 0 | 0 |
| Neazone A stain (in oil) | 2 | 2 |

*0 = no effect, 4 = severe effect

These results indicate that, for certain stains, the sample prepared according to the present invention is superior to the reference material.

The specular gloss of the samples was measured essentially as described in ANSI/ASTM D 523-78. Light was directed onto the surface of each sample at an incident angle of 60° and the gloss was measured in relation to a reference standard using a Gardner gloss meter. The following results indicate that the samples would be comparable in gloss retention when subjected to foot traffic.

| | | |
| --- | --- | --- |
| Initial gloss (60°) | 79 | 87 |
| Gloss after 30 min. on traffic wheel | 66 | 73 |
| Gloss after 60 min. on traffic wheel | 38 | 34 |
| Gloss after 90 min. on traffic wheel | 19 | 23 |

My invention is not restricted solely to the descriptions and illustrations provided above, but encompasses all modifications envisaged by the following claims.

We claim:

1. A process for preparing a plasticized polyvinyl chloride substrate comprising a moisture-cured polyurethane coating, said process comprising the steps of
   preparing a prepolymer composition comprising a moisture-curable polyurethane prepolymer and a plasticizer,
   applying said prepolymer composition to a plasticized polyvinyl chloride substrate, and
   heating and moisture-curing the coated substrate, whereby a substantial portion of the plasticizer in said coating migrates into said substrate.

2. The invention as set forth in claim 1 hereof wherein said prepolymer composition comprises not less than 25 parts by weight of plasticizer for every 100 parts by weight of prepolymer precursors.

3. The invention as set forth in claim 2 hereof wherein said ratio of plasticizer to prepolymer precursors is not less than 40:100.

4. The invention as set forth in claim 3 hereof wherein said ratio is not less than 60:100.

5. A plasticized polyvinyl chloride substrate comprising a moisture-cured polyurethane coating, said coated substrate being obtained by
   preparing a prepolymer composition comprising a moisture-curable polyurethane prepolymer and a plasticizer,
   applying said prepolymer composition to a plasticized polyvinyl chloride substrate, and
   heating and moisture-curing the coated substrate, whereby a substantial portion of the plasticizer in said coating migrates into said substrate.

6. The invention as set forth in claim 5 hereof wherein said composition comprises not less than 25 parts by weight of plasticizer for every 100 parts by weight of prepolymer precursors.

7. The invention as set forth in claim 6 hereof wherein said ratio of plasticizer to prepolymer precursors is not less than 40:100.

8. The invention as set forth in claim 7 hereof wherein said ratio is not less than 60:100.

* * * * *